United States Patent [19]
Manning

[11] 3,794,373
[45] Feb. 26, 1974

[54] BUS SIDE PANEL

[75] Inventor: Donald L. Manning, Orchard Lake, Mich.

[73] Assignee: General Motors Corporation, Detroit, Mich.

[22] Filed: May 30, 1972

[21] Appl. No.: 257,759

[52] U.S. Cl............................. 296/28 A, 296/31 P
[51] Int. Cl........................................ B62d 31/04
[58] Field of Search.. 296/28 A, 28 AB, 28 R, 31 P, 296/31 R

[56] References Cited
UNITED STATES PATENTS
2,758,870  8/1956  Nallinger ......................... 296/28 A FOREIGN PATENTS OR APPLICATIONS
1,564,782  3/1969  France ............................ 296/28 A Primary Examiner—David Schonberg
Assistant Examiner—John A. Pekar

[57] ABSTRACT

The structural framework of a bus body includes carlines of tubular steel construction spaced longitudinally thereof. The outer sidewall construction of the bus body includes a plurality of lower side panels. The lower edge portion of each side panel is attached to the carlines in laterally spaced relation therefrom by resilient links of tire carcass. The upper edge portion of the lower side panel includes an inwardly offset continuous flange which is juxtaposed to an outwardly extending flange on an upper side panel. A rubber rubrail attached to the upper side panel includes a downwardly extending portion having a groove in which an insert may be installed to spread the lower portion downwardly and inwardly to hold the inwardly offset flange of the lower panel against the outwardly extending flange of the upper panel and thereby attach the lower side panel to the body. When the lower side panel is impacted it pivots about its upper edge portion as permitted by yielding of the rubber rubrail as its lower side portion is moved inwardly toward the carlines as the resilient links yield.

2 Claims, 3 Drawing Figures

PATENTED FEB 26 1974   3,794,373
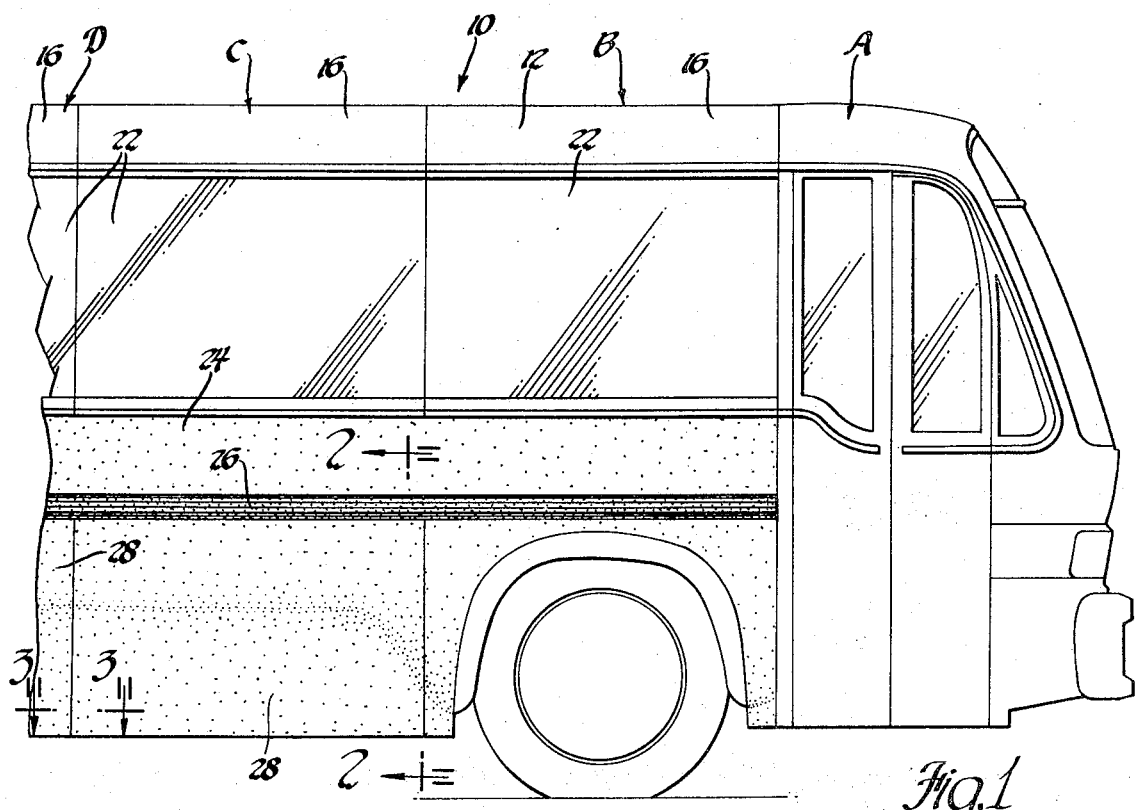
Fig.1
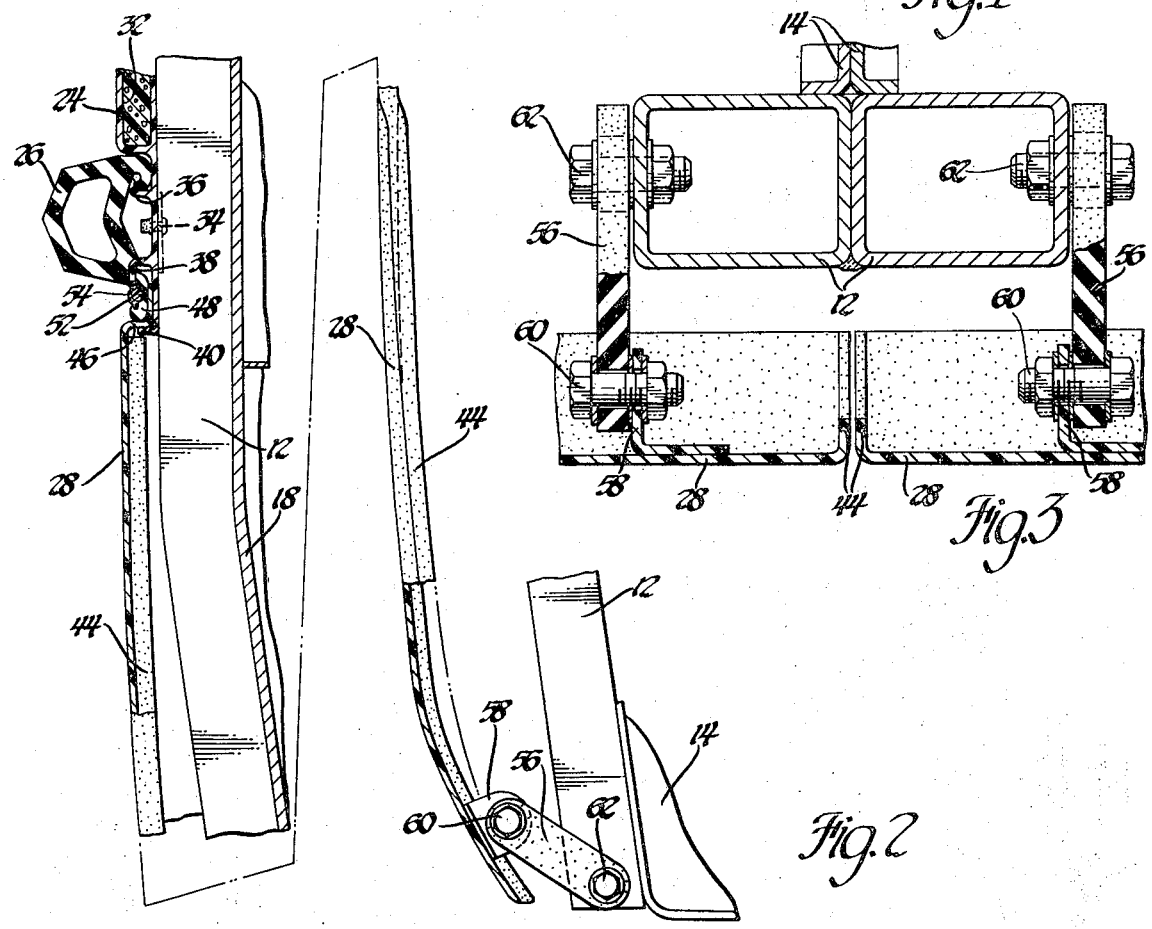
Fig.2
Fig.3

BUS SIDE PANEL

The invention relates to an outer sidewall structure for a motor vehicle and more particularly to an outer sidewall structure for a bus body.

Unlike vehicles which have a separate body and frame, conventional bus bodies have a steel framework with an outer skin of aluminum plates riveted thereto to provide an integral frame and body capable of withstanding road shock, driving and braking stresses. Repair of collision or other damage necessitates the removal of the rivets, and straightening or replacement of the aluminum plates. It is also well known that in order to prevent galvanic corrosion of aluminum, the surfaces of dissimilar metals such as steel in contact with the aluminum must be properly coated with paint or be plated.

It will therefore be apparent that it is advantageous to provide a bus sidewall structure which may be easily assembled to the bus body, is not subject to galvanic corrosion, and may be easily replaced when damaged.

The present invention provides such an outer sidewall structure for a bus body which includes a lower side panel spaced from the body structural framework at its lower portion to protect the framework from collision damage.

The bus body includes carlines of tubular steel construction spaced longitudinally thereof. Such carlines may advantageously define and are herein disclosed as defining the end of body modules although it will be understood that such a modular body construction is not essential to the structure of this invention. An extruded upper side panel is attached to the longitudinally spaced carlines and runs longitudinally along the length of the vehicle body just below the side windows. Flanges formed in the lower portions of the upper panel mount a rubber rubrail which also runs longitudinally of the length of the vehicle. The rubrail includes a downwardly extending portion having a groove which receives an insert. The lower outer sidewall construction of the vehicle body includes a number of the lower side panels, each of module length. A continuous longitudinally extending inwardly offset flange at the upper edge portion of each of the lower side panels is placed between an outwardly extending flange of the upper panel and the downward extending portion of the rubber rubrail. Installation of the insert in the groove of the rubrail spreads the downwardly extending portion of the rubrail against the flange of the lower side panel to attach its upper edge portion to the upper panel. The lower side panel has at its lower edge portion longitudinally spaced brackets extending laterally thereof. A length of rubber tire carcass is bolted to the brackets and to the body carlines. The tire carcass holds the lower portion of the lower side panel in laterally spaced relation to the carline and yields when the lower side panel is impacted permitting the side panel to pivot inwardly toward the carlines. The rubrail yields sufficiently to permit the lower side panel to pivot about the flange during such impact.

One feature of the present invention is that it provides an exterior sidewall construction for a bus including a plurality of lower side panels resiliently mounted in laterally spaced relationship to the body frame structure and deflectable or laterally movable toward such framework under impact.

Another feature of the invention is the provision of a bus exterior sidewall construction of dent and corrosion resistant material.

A still further feature of the invention is the provision of an exterior sidewall construction for a bus body including a plurality of separate panels attached to the body framework at only their upper and lower edge portions and removable individually to facilitate replacement of such panels.

These and other features and advantages of the invention will become apparent upon consideration of the appended specification and the drawings in which:

FIG. 1 is a partial side elevation view of a bus body embodying the invention;

FIG. 2 is a sectional view taken in the direction of arrows 2—2 of FIG. 1; and

FIG. 3 is a cross-section view taken in the direction of arrows 3—3 of FIG. 1.

Referring to FIG. 1, a bus body generally indicated at 10 is shown. The bus body 10 is of modular construction and includes a driver and entry module A, a front suspension module B, and body modules C and D. The bus body 10 also includes other body modules identical to C and D, a rear suspension module, and an engine module not shown.

Each of the modules has an integral stress sustaining structural framework provided by longitudinally spaced U-shaped carlines 12, transversely extending bulkheads 14, a roof structure 16, and an inner sidewall structure 18. As best seen in FIG. 3, the carlines 12 define the end portions of the respective modules and are of rectangular tubular construction to provide high strength and low weight. The U-shaped carlines 12 extend vertically through the sidewalls of the body as shown in FIG. 2 and horizontally through the roof structure 16. The U-shaped carlines 12 open downwardly and are joined at their respective lower portions by transversely extending bulkheads 14. The roof structure 16 of each module includes inner and outer panels which are welded at their respective ends to the spaced carlines 12. Each module also includes an inner wall structure 18 extending longitudinally between the spaced carlines 12 and welded thereto. The various modules are joined to form the body 10 by welding the carlines 12, bulkheads 14, and inner sidewall structures 18 of the adjacent modules together. A floor structure extends between the bulkheads 14 and cooperates with the inner sidewall structure 18 and roof structure 16 to define the passenger compartment.

The outer sidewall structure of the bus body 10 includes windows 22, an upper side panel 24, a rubber rubrail 26, and lower side panels 28. The upper side panel 24 is preferably a single hollow member extending the length of the body and having the space 32 therein receiving an insertable foam plastic member for thermal insulation. The upper side panel 24 is conventionally fastened to the carlines 12 by bolts 34. The upper side panel 24 also has integral flanges 36, 38, and 40. The extruded rubber rubrail 26 has integrally molded continuous slots therein which permit attachment of the rubrail 26 to the flanges 36 and 38 of the upper side panel by sliding the rubber rubrail 26 lengthwise on the flanges 36 and 38 the length of the upper side panel 24.

The outer sidewall structure also includes lower side panels 28 which are of module length having an inwardly offset flange 46 at the upper edge thereof. The fore and aft side edge portions of the lower side panels 28 are formed inwardly of the body to provide flanges 44 which stiffen the panel. The integrally molded offset flange 46 at the upper edge portion of lower side panel 28 is inserted between the outwardly extending flange 40 of upper side panel 24 and a downwardly extending portion 48 of the rubber rubrail 26.

The rubber rubrail 26 has a continuous groove 52 in the downwardly extending portion 48 thereof which receives an insert 54. When the insert 54 is installed, the portion 48 of rubrail 26 is spread inwardly and downwardly to attach offset flange 46 of the lower side panel 28 to the upper side panel 24.

The lower edge portion of lower side panel 28 is attached to the body carlines 12 by a pair of resilient links 56. Brackets 58 are bonded to the lower side panel 28 at its lower fore and aft portions. The resilient link 56 is a strip of rubber tire carcass attached at one end to the bracket 58 by a conventional fastener 60 and at the other end to the carlines 12 by a conventional fastener 62. The conventional fasteners 60 and 62 are shown as a nut, bolt, and washer assembly.

The resilient link 56 is of such length and stiffness as to support the lower edge of lower side panel 28 in laterally spaced relation from the carlines 12. When an impact is received against the lower side panel 28, the resilient link 56 will yield and the panel 20 will pivot inwardly of the body 10 about its engagement with flange 40 of upper side panel 24 as permitted by flexure of lower portion 48 of rubrail 26.

Furthermore, it will be apparent that any damaged lower side panels 28 is easily replaced. The fasteners 60 and 62 and the insert 54 are removed permitting pivotal movement of the damaged lower side panel 28 outwardly of the body until the offset flange 46 thereof clears the flange 40 of the upper side panel 24. A new lower side panel 28 can be inserted, the insert 54 reinstalled, and the resilient links 56 reconnected to the new lower side panel.

Thus it is seen that an improved bus outer sidewall construction is provided offering economy of manufacture and service.

What is claimed is:

1. An outer sidewall construction for a vehicle body having longitudinally spaced carlines and comprising an upper panel extending the length of the vehicle body and including an outwardly extending flange at the lower edge portion thereof, a rubber rubrail, means attaching the rubber rubrail to the upper panel, a plurality of discrete lower panels having upper and lower edge portions, the upper edge portion of each of the lower panels including integrally formed continuous inwardly offset flanges juxtaposed to the outwardly extending flange of the upper side panel by the rubber rubrail to pivotally secure the upper edge portions of each of the lower panels to the upper panel, resilient means attaching the lower edge portions of the lower panels to the body carlines and in laterally spaced relation therefrom, said rubber rubrail yielding to permit individual pivotal movement of the lower panels about the inwardly offset flange thereof when the resilient means yield to permit lateral movement of the lower edge portions of the lower panels toward the carlines in response to an impact thereagainst. pg,13

2. An outer sidewall structure for vehicle body having longitudinally spaced carlines and comprising: a plurality of discrete panels having upper and lower edge portions, each of the panels extending between adjacent spaced carlines to provide an outer sidewall, continuous means on the body at the upper edge portion of the plurality of discrete panels for pivotally securing the upper edge portions of each of the panels to the vehicle body, and resilient means attaching the forward and rearward lower edge portions of each of the discrete panels to the spaced carlines independently of the adjacent panel and in laterally spaced relation from the carline, the panels being independently pivotal about the upper edge thereof upon yielding of the resilient means attaching the forward and rearward lower edge portions thereof to the vehicle body whereby when an impact is received against one of the plurality of panels, that panel is movable toward the carlines while the adjacent panels remain stationary.

* * * * *